DALEY & TREAT.
Horse Rake.
No. 36,897.
Patented Nov. 11, 1862.
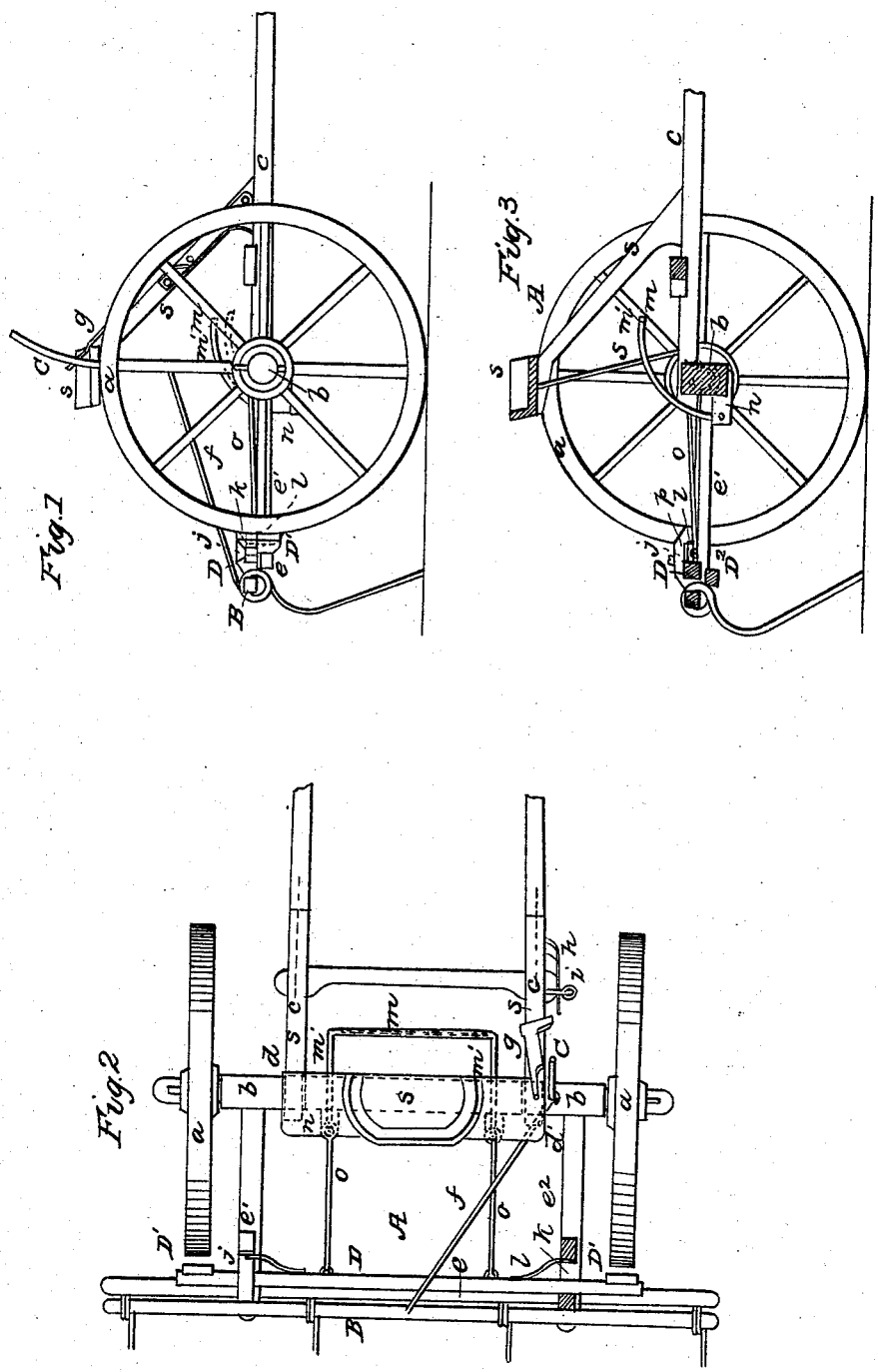

UNITED STATES PATENT OFFICE.

GEORGE H. DALEY AND ROBERT M. TREAT, OF MORRIS, CONNECTICUT.

IMPROVEMENT IN HORSE-RAKES.

Specification forming part of Letters Patent No. 36,897, dated November 11, 1862.

*To all whom it may concern:*

Be it known that we, G. H. DALEY and ROBT. M. TREAT, of Morris, in the county of Litchfield and State of Connecticut, have invented a new and useful Improvement in Wheeled Horse Hay-Rakes; and we do hereby declare the following to be a full, clear, and exact description thereof, reference being had to the accompanying drawings, forming part of this specification, in which—

Figure 1 is a side elevation of our horse hay-rake with brake applied to it. Fig. 2 is a plan of the same, and Fig. 3 a vertical longitudinal section of the same.

Similar letters of reference in the several figures indicate corresponding parts.

This invention consists in a friction-brake for horse hay-rakes, said brake consisting of a transverse bar, blocks, springs, connecting-rods, curved foot-lever frame, and hinging brackets, all constructed and operating in combination with a rake-head and the wheels of a horse hay-rake in such manner that the driver by pressing his foot down upon the lever-frame produces frictional contact between the wheels and the brake-blocks, and thus insures the automatic elevation and emptying of the rake-teeth through the leverage of the wheels alone. This arrangement of brake attachments to horse hay-rakes greatly simplifies the rake, and the parts are brought together in such manner as to be very convenient for operating and very effective in their action.

To enable others skilled in the art to make and use the invention, the same will now be described minutely with reference to the drawings.

A in the several figures of the drawings represents a wheeled horse hay-rake patented by Robt. M. Treat, June 10, 1862. The wheels $a$ $a$ revolve, and the axle $b$ turns in the path of a circle vertically. The thills $c$ $c$ are jointed loosely at $d$ $d$ to the axle, and the driver's seat is suspended upon the same. The rake-head B is attached rigidly to the axle by means of a frame, $e$, or bars $e'$ $e'$, which extend out at right angles from the rear side of the axle, and it (the rake-head) is set in rear of the wheels, and extends laterally beyond the outer faces of the same. The lever C, by which the rake-head is raised, is fastened rigidly in the top of the axle, and is connected to the rake-head by a diagonal rod, $f$. This lever is retained in any desired position, after the rake-head is elevated, by means of a pivoted catch, $g$, or a perforated bracket, $h$, and stop-pin $i$.

To the rake thus described the brake is applied as follows: The bar D, with blocks D' D', is placed on top of the frame $e$ $e'$ $e'$, so that the blocks stand behind the circumference or periphery of the wheels $a$ $a$. In this position it is confined, so as to have back-and-forward (but not upward) play, by means of half-boxes $j$ $j$, screwed upon the rear ends of the bars $e'$ $e'$, as represented. These half-boxes form oblong slots $k$ $k$ between themselves and the bars, and in said slots the brake-bar D slides, so as to come, with its blocks, in frictional contact with the periphery of the wheels $a$ $a$. Flat springs $l$ $l$ are attached to the front side of the brake-bar D, and with their free ends bear against the front shoulders of the boxes $j$ $j$, and thus keep the brake-blocks out of contact with the periphery of the wheels $a$ $a$ when the rake-head is not elevated and while the teeth thereof are raking up hay from the ground. The brake-block thus arranged is connected to the axle $b$ by means of a curved foot-lever frame, $m$ $m'$ $m'$, hinging brackets $n$ $n$, and link connecting-rods $o$ $o$, as represented. The brackets $n$ $n$ screw to the under side of the axle at a suitable distance apart, and extend beyond the rear of the same. The lever-frame is formed of two segment-arms or side bars, $m'$, and a transverse bar, $m$, and hinges by the lower ends of its segment-arms to the brackets; and the connecting-rods link to the brake-bar D, and also to the segment-arms just above the hinge of the brackets. The brake thus applied is readily operated, as the lever-frame extends, by reason of its curve form, under and below the driver's seat.

The operation is as follows: The driver sitting upon the seat with his hand upon or off the hand-lever, the rake is drawn over the field until the teeth have collected the proper quantity of hay. At this stage, it being necessary to relieve the rake-teeth of the collected hay, the driver adjusts his foot upon the part $m$ of the lever-frame and allows his weight to act upon it. This causes the brake bar and blocks to move up to the wheels far enough to produce frictional contact between the blocks and the wheels. Now, as the machine continues to move, the wheels carry the brake and rake-head up and around with them until the teeth are relieved and the driver withdraws his foot from the lever-frame. The gravity of the rake-head insures its return or descent, while the springs throw the brake-blocks out of frictional contact with the wheels.

The brake-blocks may be of leather, rubber, or any other suitable material—that is, they may be faced with such materials.

What we claim as our invention, and desire to secure by Letters Patent, is—

The combination and arrangement of the lever-frame $m\ m'\ m'$, brackets $n\ n$, link connecting-rods $o\ o$, and brake $D\ D'\ D'$ with a horse hay-rake mounted upon wheels, and having a driver's seat, substantially in the manner and for the purposes described.

GEORGE H. DALEY.
ROBERT M. TREAT.

Witnesses:
GARRY H. MINER,
C. L. SMEDLEY.